United States Patent [19]

Umekawa et al.

[11] 4,409,353
[45] Oct. 11, 1983

[54] EASILY DISPERSIBLE COMPOSITION FOR WATER SOLUBLE POLYMER

[75] Inventors: Osamu Umekawa, Kaizuka; Yosuke Ito, Osaka; Sakae Katayama, Kobe, all of Japan

[73] Assignee: Katayama Chemical Works Co., Ltd., Osaka, Japan

[21] Appl. No.: 393,380

[22] Filed: Jun. 29, 1982

[30] Foreign Application Priority Data

Jul. 11, 1981 [JP] Japan ................................. 56-108686

[51] Int. Cl.³ ................................................ C08K 3/30
[52] U.S. Cl. ..................................... 524/421; 524/423
[58] Field of Search ................................ 524/421, 423

[56] References Cited

U.S. PATENT DOCUMENTS 4,080,351  3/1978  Zalzal ................................... 524/421
4,251,416  2/1981  Palmer ................................. 524/423

Primary Examiner—Paul R. Michl
Attorney, Agent, or Firm—Hubbell, Cohen, Stiefel & Gross

[57] ABSTRACT

An easily dispersible polymer composition which comprises a powder of a water soluble polymer having flocculating property and a sodium sulfate hydrate, and optionally a magnesium sulfate hydrate and a hydroscopic agent and which shows a high degree of granularity and free-fluidity.

13 Claims, No Drawings

EASILY DISPERSIBLE COMPOSITION FOR WATER SOLUBLE POLYMER

BACKGROUND OF THE INVENTION

1. Field of the Invention

This invention relates to a polymer composition having an improved degree of dispersibility and solubility in water.

More particularly, it is concerned with an easily dispersible composition for water soluble polymer which comprises a powder of a water soluble polymer having coagulating or flocculating property and a hydrated sodium sulfate, and if required hydrated magnesium sulfate and/or a hygroscopic agent.

2. Description of the Prior Art

A water-soluble polymer having flocculating property is useful as a flocculant, aid for dehydration, or the like. It is used as an aqueous solution having a polymer content of, say, 0.1 to 1.0% by weight which is usually prepared in a tank. This aqueous solution is prepared by dissolving a polymer powder in fresh water each time it is needed, but there are not a few cases in which additional quantities of the polymer powder and water are supplied into the tank for preparing an additional supply of the solution when the tank still contains some solution which has previously been prepared, depending on the shape of the apparatus and the convenience of the work. When it is desired to prepare a large quantity of any such solution, however, there is every likelihood that the polymer powder may hardly be dissolved in water even if stirring is continued for a long time. (Because the polymer powder, when put into water, gets wet on its surface before dispersing, absorbs water and forms a gelatinous coat of the surface, which adheres each others and becomes a large mass.) This is particularly the case when the solution is prepared in a tank which holds some previously prepared solution. As the remaining solution has an increased degree of viscosity, a longer period of stirring is required for dissolving the polymer in water.

In order to solve these problems, it has been proposed to coat the surfaces of the polymer particles with a polyhydric alcohol, glycerol, or the like, or admix a mineral or vegetable oil, or the like into the polymer. It has also been proposed to prepare a composition by mixing the powder of a polymer with a powdered acid such as oxalic acid or tartaric acid, or a powdered base capable of foaming upon reaction with any such acid, so that the resulting foams may be utilized for preventing cohesion of the polymer particles physically while they are still in the 'wet' condition (Japanese Patent Application Laid-Open No. 61636/78). Recently, it has been disclosed in Japanese Patent Application Laid-Open No. 28612/81 that a powdered composition for flocculant is obtained by mixing a polyacrylamide and calcium chloride dihydrate with water in an amount which is sufficient to mix the former two components but is less than the amount to be maintained in the molecule of calcium chloride. However, such compositions show disadvantages such as less storage stability and lack of free-fluidity. None of these proposals has, however, been fully satisfactory from the technical or economical stand-point.

Further, the inventors of this invention have proposed an easily dispersible composition comprising a water soluble polymer, an alkali metal hydrogensulfate and a basic inorganic salt such as dipotassium hydrogenphosphate (Japanese Patent Application No. 160569/1974, U.S. patent application Ser. No. 274,437, German Patent Application No. P3123922.6).

SUMMARY OF THE INVENTION

This invention provides an easily dispersible polymer composition having a high degree of granularity which comprises a water-soluble polymer powder having flocculating ability and a hydrated sodium sulfate and further if required magnesium sulfate hydrate and/or a hygroscopic agent.

The composition of this invention can be very easily dispersed in water to form a uniform solution, and be used without causing any problem for preparing a solution even in the presence of a previously prepared solution. Moreover, it is not corrosive to metals, has an outstanding degree of storage stability, and is easy to handle.

PREFERRED EMBODIMENT OF THE INVENTION

The composition of this invention is a fine powder of free-fluidity. It may be manufactured, for example, by mixing a powdered sodium sulfate hydrate and a water soluble polymer powder, in a twin-cylinder mixer. When a magnesium sulfate hydrate and/or a hygroscopic agent are mixed in the above mixture, it may provide a further improved composition.

The invention bases on a new discovery of the fact that when a water soluble polymer powder is mixed with a sodium sulfate hydrate (7 hydrates or 10 hydrates), with stirring, the mixture is gradually swollen and uniformally granulated. This fact is considered to be the technical idea different from those of utilizing the neutralization between an acidic inorganic salt and a basic inorganic salt to the granulation of a polymer, or of adding water to an inorganic salt being capable to contain crystal water and utilizing its water absorption ability to the granulation.

Any polymer may be used for preparing the composition of this invention if it is soluble in water, and has a flocculating or coagulating ability which enables it to be used as a flocculant, or an aid for dehydration which accomplishes dehydration as a secondary effect of coagulation. It may be a synthetic, semisynthetic or natural polymer of any type, including anionic, nonionic or cationic. It may be a low polymer having a molecular weight of, say, 1,000, or a high polymer having a molecular weight of tens of millions. This invention is, however, applicable more advantageously to a polymer having a high degree of polymerization.

Examples of the anionic polymers include polyacrylic acid and its salts, acrylic acid-maleic acid copolymer and its salts, partially hydrolyzed polyacrylamides, sodium alginate, and sodium carboxymethylcellulose. Examples of the cationic polymers include chitosan, polyvinyl pyridine and its salts, aminated acrylic ester polymers such as aminoethyl polymethacrylate or the quaternary products thereof, aminated acrylic ester copolymers, and cation modified polyacrylamides. Examples of the nonionic polymers include polyacrylamides, polyethyleneoxides, polyvinyl alcohols and guar gum. It is particularly advantageous to use a nonionic or anionic polymer.

Examples of the hydrated sodium sulfate to be employed in this invention include the heptahydrate or decahydrate, or mixture thereof.

As regards the hygroscopic agent (or desiccant), it is preferable to use a natural inorganic salt, such as sodium sulfate anhydride, potassium sulfate anhydride or magnesium sulfate anhydride.

Examples of hydrated magnesium sulfate are the hexahydrate or heptahydrate of magnesium sulfate.

According to this invention, the sodium sulfate is believed to act such role as separating particles of the polymer not so as to be adhered to each other when they are dissolved in water. It also imparts to the polymer powder a high degree of granularity which facilitates its formulation into a particular shape.

According to one aspect of this invention, there is, thus, provided a composition comprising 5 to 90 parts by weight of a polymer and 95 to 10 parts by weight of a hydrated sodium sulfate. The ratio of the polymer and the above sodium sulfate is preferable to be 10 to 80 parts and 90 to 20 parts, more preferable to be 40 to 60 parts and 60 to 40 parts. This composition may be dispersed and dissolved in fresh water very easily and quickly to form an aqueous polymer solution without developing any undissolved mass. The composition maintains its fine granularity and good fluidity for a long time of, say, at least several months, not only at low temperature, but also even at room temperature not exceeding 25° C., and is easy to handle for use.

According to another aspect of this invention, there is provided a composition containing a hydrated magnesium sulfate and/or a hydroscopic agent in addition to the two components mentioned above.

The hydrated magnesium sulfate permits easy dispersion and dissolution of the polymer in a previously prepared aqueous solution of the composition having a relatively low concentration. It also prevents formation of a mass by the polymer and its adherence to the wall of an apparatus which are likely to occur to certain kinds of polymers during the preparation of the composition.

Thus, the composition comprises 5 to 90 parts by weight (preferably 10 to 80, more preferably 40 to 60 parts) of a polymer, and 95 to 10 parts by weight (preferably 90 to 20, more preferably 60 to 40 parts) of a hydrated sodium sulfate and a hydrated magnesium sulfate. The ratio by weight of the hydrated sodium sulfate and the hydrated magnesium sulfate is preferably 1:1 to 9:1.

The hygroscopic agent or desiccant can improve storage stability of the composition, and prevent the formation of a mass of other changes in its properties during a long period of storage particularly at a high temperature of at least 30° C. in summer.

If magnesium sulfate anhydride is used as the hygroscopic agent, it also facilitates dispersion and dissolution of the polymer in a previously prepared aqueous polymer solution having a relatively high concentration.

Thus, the composition may comprise 5 to 90 parts by weight (preferably 10 to 80, most preferably 40 to 60 parts) of a polymer, and 95 to 10 parts by weight (preferably 90 to 20, most preferably 60 to 40 parts) of a hydrated sodium sulfate and a hygroscopic agent. The ratio by weight of the hydrated sodium sulfate and the hygroscopic agent is preferably 1:2 to 5:1.

According to the preferable aspect of this invention, there is provided a composition of the four components comprising 5 to 90 parts by weight of a polymer, and 95 to 10 parts by weight of a hydrated sodium sulfate, a hydrated magnesium sulfate and a hygroscopic agent, particularly magnesium sulfate anhydride; the preferable and more preferable range being the same as in the above composition. This composition is easy to disperse and dissolve in water and in a previously prepared aqueous polymer solution, and maintains a high degree of storage stability without forming a mass, or undergoing any other change in properties during a long period of storage even at a high temperature. The composition does not form a mass or stick to the wall of an apparatus during its preparation.

The composition obtained by this invention is a granular form having a high degree of fluidity, in which a particle size is generally 1 to 4 mm, preferably 2 to 3 mm.

The invention will now be described with reference to non-limitative examples, and comparative examples. Various kinds of compositions were prepared from various kinds of water-soluble high polymers, i.e., anionic (partially hydrolyzed polyacrylamide and sodium carboxymethylcellulose), nonionic (polyacrylamide), and cationic (polyacrylic ester and cation-modified polyacrylamide), in the manner which will hereinafter be described. Their properties are shown in Table 1, in which the values are shown in parts by weight.

Each of the compositions was prepared by mixing a powdered sodium sulfate hydrate, and a polymer powder, optionally a hydrated magnesium sulfate, followed by, if required, admixing a hygroscopic agent, too. All the mixing was performed by using a twin-cylinder mixer.

The following is an explanation of the various properties shown in Table 1

1. Granularity

The evaluation of granularity was based on whether or not the polymer particles stick to the wall of the mixer or form a mass during the preparation of the composition. In Table 1, the mark "o" means satisfactory, and the mark "x" means unacceptable.

2. Thermal Stability

For the evaluation of thermal stability, 50 g of a sample were placed in a closed sampling bottle, and after the sampling bottle was left at rest in a vessel having a constant temperature of 50° C. for 15 hours, it was taken out of the vessel, and turned upside down. The evaluation of thermal stability was based on whether the sample did not form a mass, but remained fluidizable. In Table 1, the mark "o" means that the sample did not form any mass at all, but remained completely fluidizable. The mark "Δ" means that, though a part (about ¼ to 1/5) of the sample formed a mass, the mass was broken and became fluidizable if the sampling bottle was shaken lightly. The mark "x" means that the sample formed a mass as a whole, and did not recover fluidity.

None of the compositions marked "o" and "Δ" in Table 1 formed any mass when a package containing 10 kg of the composition was left at room temperature during the summer season.

3. Dispersibility and Solubility in Water

For this evaluation, 50 g of each polymer composition were put in 25 liters of city water of Osaka, Japan, and an attempt was made to dissolve it therein, while the water was being stirred by a stirrer having two stages of three stirring blades each, and rotated at a speed of 300 rpm. The mark "o" means that the composition was uniformly dissolved in water, while the mark "x" means that the solution contained an undissolved mass of the composition.

4. Dispersibility and Solubility in Aqueous Solution of Water-Soluble Polymer Composition Each polymer composition was dissolved in city water of Osaka, Japan to form three aqueous solutions having a viscosity of 5 cps, 7 cps and 10 cps, respectively. Fifty grams of the same composition were put in 25 liters of each of the solutions, and an attempt was made to dissolve it therein, while each solution was being stirred by a stirrer having two stages of three stirring blades each, and rotated at a speed of 300 rpm. The mark "o" means that the composition was dissolved in all of the three previously prepared solutions uniformly, while the mark "x" means that the composition formed an undissolved mass in all of the previously prepared solutions, and the mark "Δ" means that the composition was uniformly dissolved only in the solution having a viscosity of 5 cps.

The following is a description of the results obtained from Examples of this invention and Comparative Examples, and shown in Table 1.

1. Anionic Polymers (1) Partially Hydrolyzed Polyacrylamide Having a Molecular Weight of 10,000,000.

A composition consisting solely of the polymer (Comparative Example 2) is satisfactory in thermal stability but unacceptable in dispersibility and solubility in water, and other properties. A composition containing sodium sulfate decahydrate is acceptable in thermal stability, but unacceptable in other properties if it contains too high a proportion of the polymer (Comparative Example 1). Composition containing the polymer, sodium sulfate decahydrate within the weight proportions according to this invention (Examples 1 and 2) are satisfactory in granularity and thermal stability, and satisfactorily dispersible and thermal stability, and satisfactorily dispersible and soluble both in water and in a previously prepared aqueous solution of the polymer composition having a relatively low viscosity which is not higher than 5 cps. A composition containing the polymer, sodium sulfate decahydrate, and magnesium sulfate heptahydrate within the weight proportions according to this invention (Example 3) is satisfactory in granularity and thermal stability, and satisfactorily dispersible and soluble both in water and in a previously prepared aqueous solution of the polymer composition having a high viscosity. A composition containing the polymer, sodium sulfate decahydrate, and magnesium sulfate anhydride within the weight proportions according to this invention (Example 4), and a composition containing the polymer, sodium sulfate decahydrate, magnesium sulfate heptahydrate and magnesium sulfate anhydride within the weight proportions according to this invention (Example 5) are satisfactory in all the properties. The compositions of Examples 4 and 5 are highly beneficial for practical use, since they do not form a mass during a long period of storage even at a high temperature, and can be easily dissolved in water, and even in previously prepared aqueous solution of the composition. A composition of Example 6, which contains sodium sulfate anhydride instead of magnesium sulfate anhydride, but otherwise duplicates that of Example 5, is satisfactorily dispersible and soluble in a previously prepared solution having a low viscosity not exceeding 5 cps, though it is inferior to the composition of Example 5 in dispersibility and solubility in a previously prepared solution having a higher viscosity, and is satisfactory in all the other respects.

(2) Sodium Carboxymethylcellulose Having an Etherification Degree of 0.6±0.05 and an Average Molecular Weight of 150,000.

A composition of this polymer according to Example 8 of this invention is satisfactory in all the respects in which it has been tested.

2. Nonionic Polymer (1) Polyacrylamide Having a Molecular Weight of 6,000,000.

A composition of this polymer containing sodium sulfate decahydrate (Example 9) is satisfactory in granularity, thermal stability, and dispersibility and solubility in water and a previously prepared solution having a low viscosity which is not higher than 5 cps. A composition of this polymer containing sodium sulfate decahydrate, magnesium sulfate heptahydrate and magnesium sulfate anhydride (Example 10) is satisfactory in all the respects in which it has been tested.

3. Cationic Polymers (1) Aminoethyl Polyacrylate Having a Molecular Weight of 5,000,000.

A composition of this polymer containing sodium sulfate decahydrate (Example 11) is satisfactory in granularity, thermal stability, and dispersibility and solubility in water and a previously prepared solution having a low viscosity which is not higher than 5 cps. A composition of this polymer containing sodium sulfate decahydrate, mangesium sulfate heptahydrate and magnesium sulfate anhydride (Example 12) is satisfactory in all the respects in which it has been tested.

(2) Cation-Modified Polyacrylamide Having a Molecular Weight of 4,000,000.

Compositions of this polymer (Examples 13 and 14), which substantially duplicate the compositions of Examples 9 and 10, respectively, in the proportions of their components, are equal to those of Examples 9 and 10, respectively, in all of the respects in which they have been tested.

The results of the examples as hereinabove described and shown in Table 1 confirm that the composition of this invention is an easily dispersible composition of a water-soluble polymer.

TABLE 1

I. Anionic Polymer

|  | Polymer | Sodium sulfate decahydrate $Na_2SO_4 \cdot 10H_2O$ | Magnesium sulfate heptahydrate $MgSO_4 \cdot 7H_2O$ | Magnesium Sulfate anhydride $MgSO_4$ | Sodium sulfate anyhydride $Na_2SO_4$ | Granularity | Thermal stability | Water dispersibility and solubility | Dispersibility and solubility in an aqueous solution of a polymer composition |
|---|---|---|---|---|---|---|---|---|---|
| A. Partially Hydrolyzed Polyacrylamide (M.W. 10,000,000) | | | | | | | | | |
| Example 1 | 5 | 5.0 | — | — | — | o | Δ | o | Δ |
| Example 2 | 8 | 2.0 | — | — | — | o | Δ | o | Δ |
| Example 3 | 5 | 2.5 | 2.5 | — | — | o | Δ | o | o |
| Example 4 | 5 | 2.0 | — | 3 | — | o | o | o | o |
| Example 5 | 7 | 2.0 | 0.5 | 0.5 | — | o | o | o | o |

TABLE 1-continued

| | Polymer | Sodium sulfate decahydrate Na₂SO₄.10H₂O | Magnesium sulfate heptahydrate MgSO₄.7H₂O | Magnesium sulfate anhydride MgSO₄ | Sodium sulfate anhydride Na₂SO₄ | Granularity | Thermal stability | Water dispersibility and solubility | Dispersibility and solubility in an aqueous solution of a polymer composition |
|---|---|---|---|---|---|---|---|---|---|
| Comparative Example 1 | 9.4 | 0.5 | — | — | — | X | Δ | X | X |
| Comparative Example 2 | 10 | — | — | — | — | — | O | X | X |
| Example 6 | 7 | 2.0 | 0.5 | — | 0.5 | O | O | O | Δ |
| Example 7 | 5 | 2.0 | 1 | 2 | — | O | O | O | O |
| B. Sodium Carboxymethylcellulose (Etherification degree: 0.6 ± 0.05, Average molecular weight: 150,000) | | | | | | | | | |
| Example 8 | 1 | 4.0 | 2 | 3 | — | O | O | O | O |
| Comparative Example 3 | 9.5 | 0.5 | — | — | — | X | Δ | X | X |
| Comparative Example 4 | 10 | — | — | — | — | — | O | X | X |

II. Nonionic Polymer

| | Polymer | Sodium sulfate decahydrate Na₂SO₄.10H₂O | Magnesium sulfate heptahydrate MgSO₄.7H₂O | Magnesium sulfate anhydride MgSO₄ | Sodium sulfate anhydride Na₂SO₄ | Granularity | Thermal stability | Water dispersibility and solubility | Dispersibility and solubility in an aqueous solution of a polymer composition |
|---|---|---|---|---|---|---|---|---|---|
| A. Polyacrylamide (M.W. 6,000,000) | | | | | | | | | |
| Example 9 | 8 | 2.0 | — | — | — | O | Δ | O | Δ |
| Example 10 | 5 | 2.0 | 1 | 2 | — | O | O | O | O |
| Comparative Example 5 | 9.5 | 0.5 | — | — | — | X | Δ | X | X |
| Comparative Example 6 | 10 | — | — | — | — | — | O | X | X |

III. Cationic Polymer

| | Polymer | Sodium sulfate decahydrate Na₂SO₄.10H₂O | Magnesium sulfate heptahydrate MgSO₄.7H₂O | Magnesium sulfate anhydride MgSO₄ | Sodium sulfate anhydride Na₂SO₄ | Granularity | Thermal stability | Water dispersibility and solubility | Dispersibility and solubility in an aqueous solution of a polymer composition |
|---|---|---|---|---|---|---|---|---|---|
| A. Aminoethyl polyacrylate (M.W. 5,000,000) | | | | | | | | | |
| Example 11 | 7 | 3.0* | — | — | — | O | Δ | O | Δ |
| Example 12 | 4 | 2.0* | 1.0 | 3.0 | — | O | O | O | O |
| Comparative Example 7 | 9.5 | 0.5* | — | — | — | X | Δ | X | X |
| Comparative Example 8 | 10 | — | — | — | — | — | O | X | X |
| B. Cation Modified Polyacrylamide (M.W. 4,000,000) | | | | | | | | | |
| Example 13 | 8 | 2.0 | — | — | — | O | Δ | O | Δ |
| Example 14 | 6 | 2.0 | 1 | 1 | — | O | O | O | O |
| Comparative Example 9 | 9.5 | 0.5 | — | — | — | X | Δ | X | X |
| Comparative Example 10 | 10 | — | — | — | — | — | O | X | X |

*Na₂SO₄.7H₂O was used.

What we claim is:

1. An easily dispersible composition having a high degree of granularity and free-fluidity which comprises a powder of a water-soluble polymer having flocculating ability and a hydrated sodium sulfate, and if required a hydrated magnesium sulfate and/or a hydroscopic agent.

2. A composition of claim 1 wherein the water soluble polymer is a nonionic, anionic or cationic polymer.

3. A composition of claim 1 wherein the water soluble polymer is a nonionic polyacrylamide, an anionic partially hydrolyzed polyacrylamide or sodium carboxymethylcellulose, or cationic aminoethyl polyacrylate or cation modified polyacrylamide.

4. A composition of claim 1 wherein the hydrated sodium sulfate is the heptahydrate or decahydrate of sodium sulfate or mixture thereof.

5. A composition of claim 1 wherein the hydroscopic agent is sodium sulfate anhydride, potassium sulfate anhydride or magnesium sulfate anhydraide.

6. A composition of claim 1 wherein the hydrated magnesium sulfate is the hexahydrate or heptahydrate of magnesium sulfate.

7. A composition of claim 1, comprising 5 to 90 parts by weight of the water soluble polymer and 95 to 10 parts by weight of the hydrated sodium sulfate.

8. A composition of claim 1, comprising 5 to 90 parts by weight of the water soluble polymer and 95 to 10 parts by weight the hydrated sodium sulfate, the hydrated magnesium sulfate and the hygroscopic agent.

9. A composition of claim 1, comprising 5 to 90 parts by weight of the water soluble polymer and 95 to 10 parts by weight the hydrated sodium sulfate and the hydrated magnesium sulfate.

10. A composition of claim 1, comprising 5 to 90 parts by weight of the water soluble polymer and 95 to 10 parts by weight the hydrated sodium sulfate and the hygroscopic agent.

11. A composition of claim 9, wherein the ratio by weight of the hydrated sodium sulfate and the hydrated magnesium sulfate is 1:1 to 9:1.

12. A composition of claim 10 wherein the ratio by weight of the hydrated sodium sulfate and the hygroscopic agent is 1:2 to 5:1.

13. A composition of any of claims 1–12 which is a granula form having a free fluidity.

* * * * *